United States Patent [19]

Slavin et al.

[11] Patent Number: 4,554,406

[45] Date of Patent: Nov. 19, 1985

[54] ELECTRIC WIRING TERMINAL AND METHOD OF MAKING SAME

[75] Inventors: Michael Slavin, Troy; Ellsworth S. Miller, Mt. Clemens, both of Mich.

[73] Assignee: Lectron Products, Inc., Rochester, Mich.

[21] Appl. No.: 634,184

[22] Filed: Jul. 26, 1984

Related U.S. Application Data

[63] Continuation of Ser. No. 375,764, May 6, 1982, abandoned.

[51] Int. Cl.⁴ .................................................. H01R 4/10
[52] U.S. Cl. ................................ 174/94 R; 174/84 C; 339/276 A; 339/276 F
[58] Field of Search ............................. 174/84 C, 94 R; 336/192; 339/223 R, 276 R, 276 A, 276 C, 276 F, 276 T

[56] References Cited

U.S. PATENT DOCUMENTS

| | | | |
|---|---|---|---|
| 3,386,074 | 5/1968 | Woofter | 339/276 T |
| 3,496,504 | 2/1970 | Daley | 336/192 |
| 3,568,137 | 3/1971 | Youngblut | 339/276 T |
| 3,622,100 | 11/1971 | Wright | 336/192 X |
| 3,730,972 | 5/1973 | Hennessey | 174/94 R |
| 3,910,666 | 10/1975 | McIntosh | 336/192 |

FOREIGN PATENT DOCUMENTS

| | | | |
|---|---|---|---|
| 568246 | 12/1932 | Fed. Rep. of Germany | 339/276 C |
| 534966 | 4/1973 | Switzerland | 336/192 |

*Primary Examiner*—A. T. Grimley
*Assistant Examiner*—Morris H. Nimmo
*Attorney, Agent, or Firm*—Harness, Dickey & Pierce

[57] ABSTRACT

An electrical terminal having a wire clamping tab connected thereto by an essentially thin neck portion about which a wire coated with a resin-type, high temperature insulation is adapted to be wound so that, when the tab is bent back against the terminal by opposed, energized electrodes to clamp a portion of the wire extending from the neck portion therebetween, resistance of the latter to flow of current heats both the neck portion and the wire wrapped therearound sufficiently to explode the insulation from the wire to assure a good electrical connection. At the same time the relatively large area of the terminal and its clamping tab maintains the clamped portion of the wire below its annealing temperature so that it is resistant to breakage in use.

18 Claims, 9 Drawing Figures

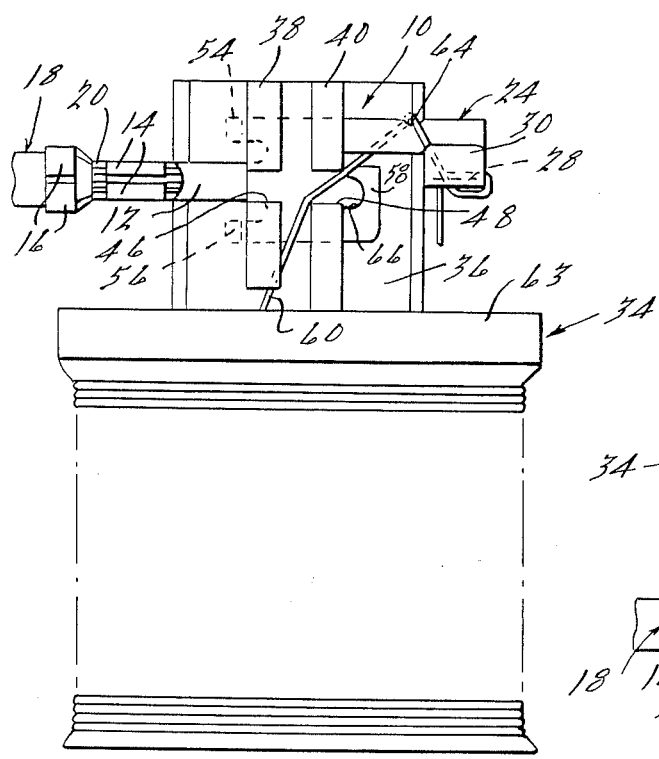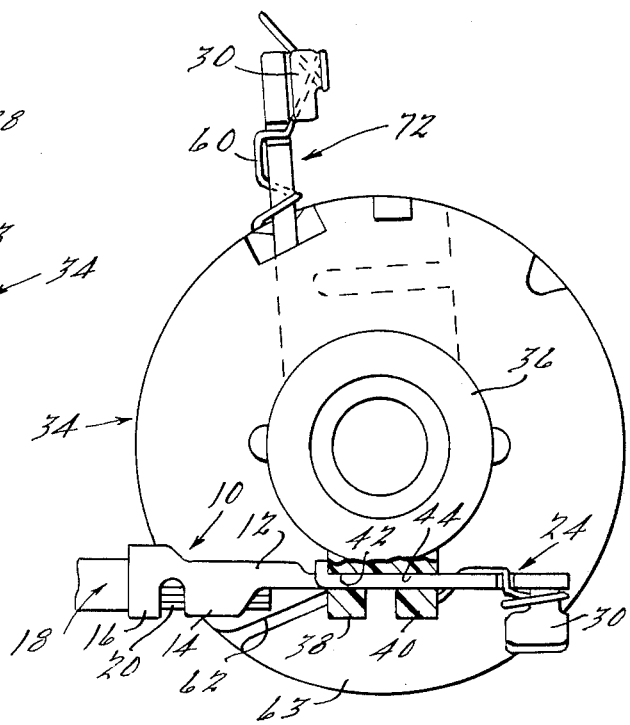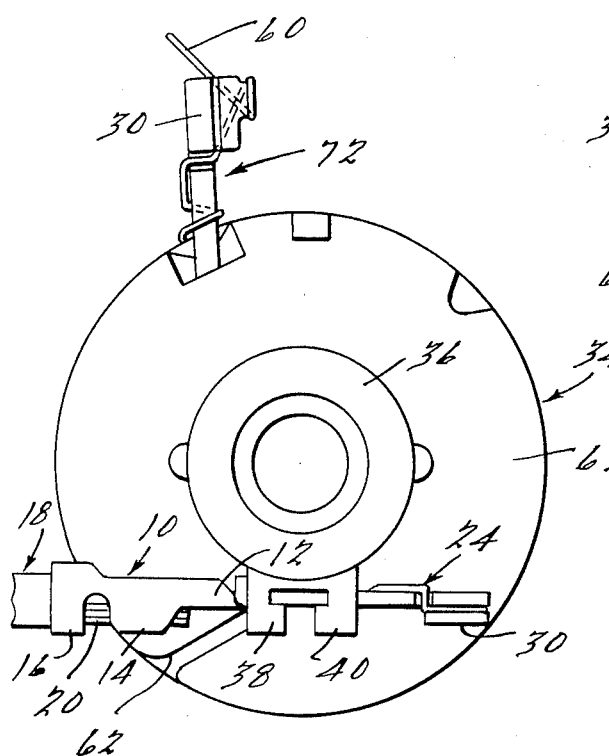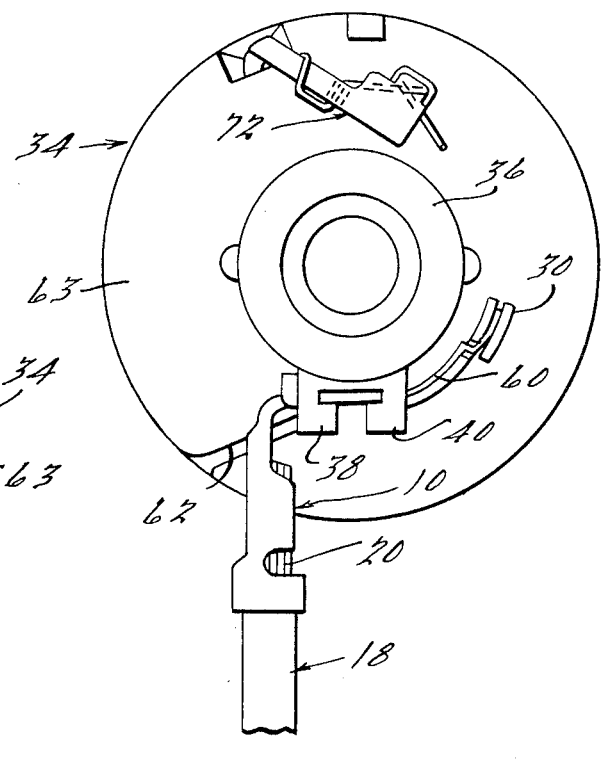

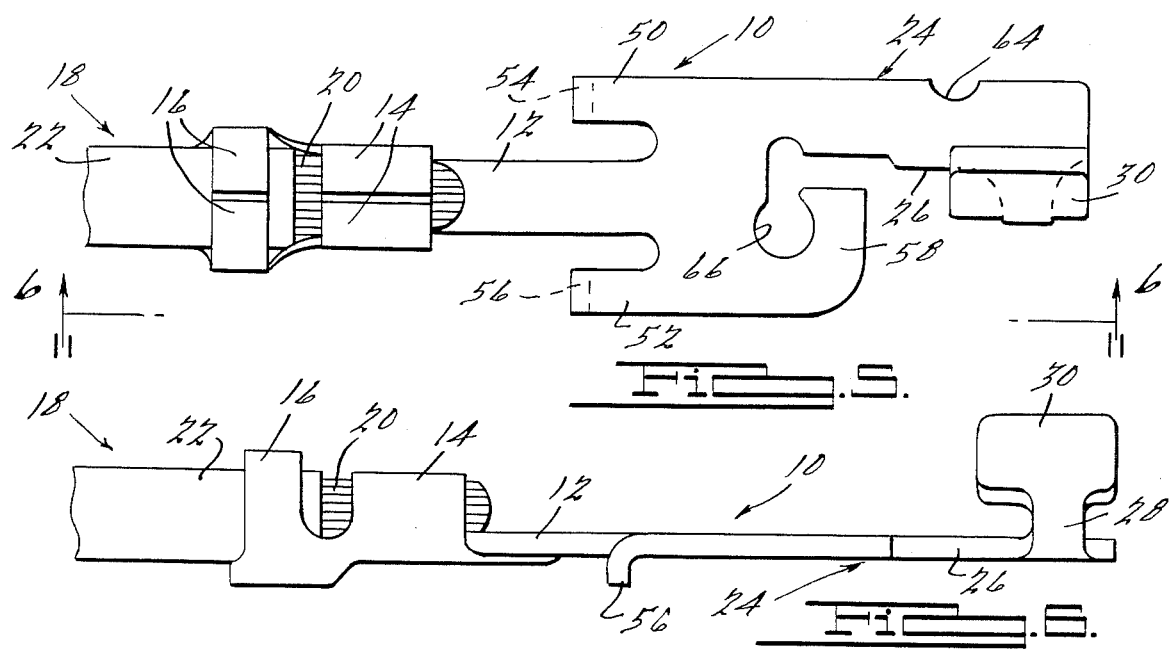
FIG. 5.
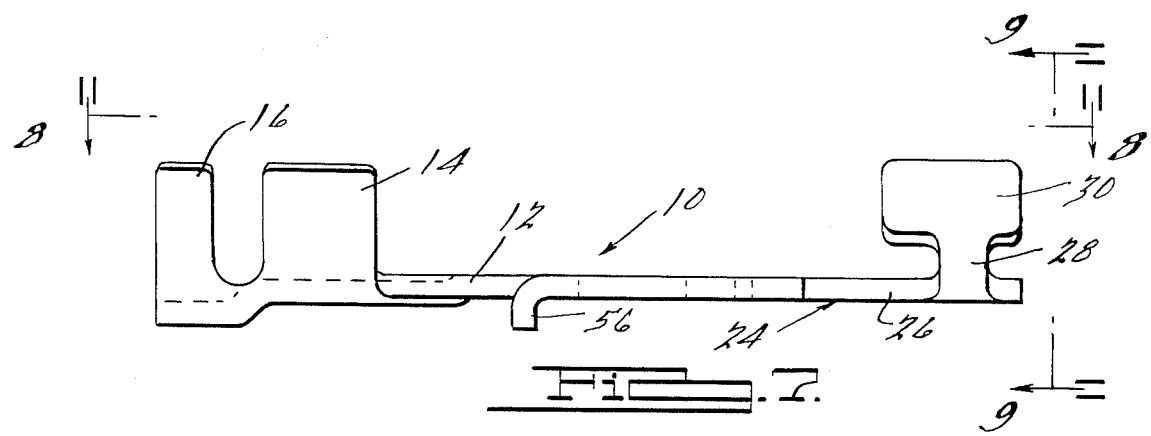
FIG. 6.
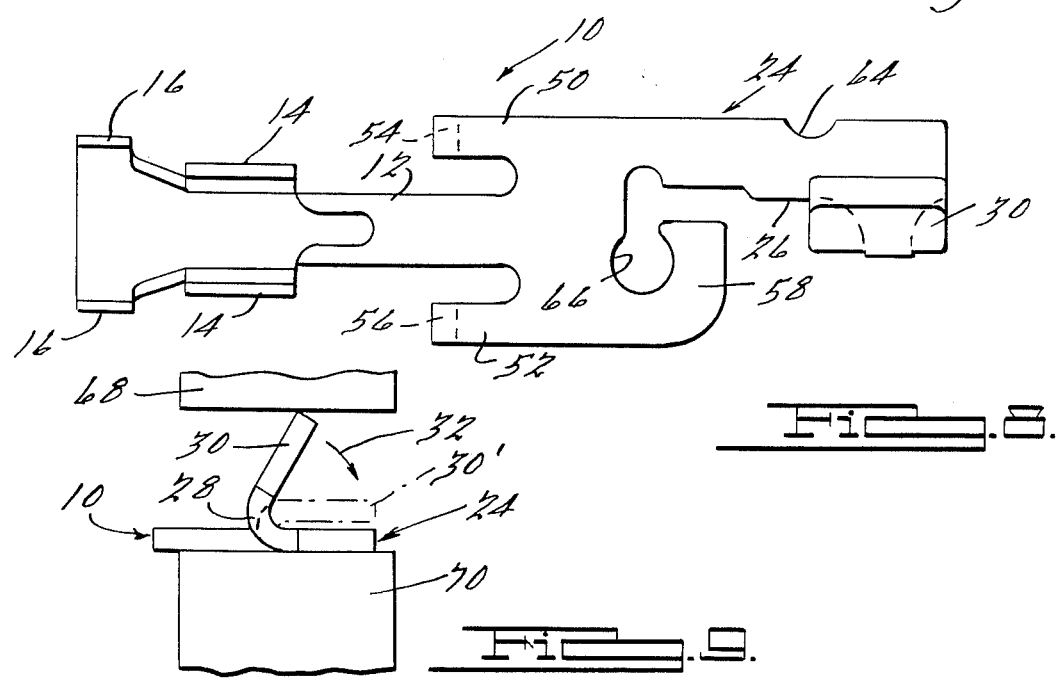
FIG. 7.
FIG. 8.
FIG. 9.

ELECTRIC WIRING TERMINAL AND METHOD OF MAKING SAME

This application is a continuation of application Ser. No. 375,764, filed May 6, 1982 now abandoned.

BACKGROUND OF THE INVENTION

Certain electrical components, such as the coils conventionally used with throttle positioners on automotive vehicles, and the actuating solenoids for diaphragm valves used in some pollution control systems of automotive vehicles, for example, necessarily use wire coated with high temperature resin-type insulation which must be stripped from the wire to assure good electrical connections at the terminals. Ordinarily, the wire at the ends of the coil are simply soldered to the terminals, and the soldering temperature of approximately 600° F. is sufficient to strip the insulation from the wire; however, in the examples referred to, the high temperature polyamid insulating coating is not removed from the wire at this temperature. Attempts have been made to solve the problem by connecting the wire to the terminals mechanically using splice chips having knurled surfaces that penetrate the insulating coating during the mechanical clamping operation, but this method does not always produce a good electrical connection and it adds significantly to the cost particularly where high production is involved. It also has been proposed to weld wire coated with high temperature insulation to its terminals as welding temperatures are sufficiently high to explode the insulation from the wire; however, welding temperatures are above the annealing temperature of the wire so that the welding operation leaves the wire extremely soft and easily broken. In many automotive environments, such as those referred to specifically above, the coils are mounted where they are subjected in use to vibration that flexes the wire back and forth at the terminal connections and soon causes it to break.

BRIEF SUMMARY OF THE INVENTION

The present invention embodies a novel method of attaching wire coated with a high temperature insulation particularly of the resin-type to a unique terminal construction using electrodes that assures a good electrical connection between the wire and the terminal and that is adaptable to mass production operations.

More particularly, the present invention utilizes an electrical terminal having a relatively large tab or flag disposed laterally or to one side of and in acute angular relation to a main portion of the terminal body to which it is connected at one edge thereof by an essentially thin neck portion. By reason of this construction and arrangement of parts, a good electrical connection is established between the terminal and a wire coated with high temperature insulation that is wound around the neck of the terminal by placing the flag and the portion of the terminal to which it is connected between opposed electrodes which are urged toward each other at a pressure that is insufficient to bend the neck in its normal state. Under these conditions, current necessarily flows between the electrodes through the neck which, because of its thin dimension, acts as a heat concentrator and quickly becomes heated to a temperature high enough to explode the insulation from the wrapped portion of the wire and simultaneously to anneal and soften the metal of the neck sufficiently so that it then yields under pressure of the electrodes to clamp an unannealed portion of the wire extending from the neck mechanically between the flag and the adjacent body of the terminal. As a consequence, a good electrical connection is established between the wire and the terminal at the neck of the latter, but the annealed and softened portion of the wire at the neck through which the connection is established is protected from breakage due to vibrations or other conditions of use.

In a typical coil assembly, the terminal is mounted in any suitable way on the spool and the wire coming off the spool is wrapped several times around the neck with the portion of the wire extending from the spool to the neck disposed between the flag and the terminal. In manufacture of the assembly, the terminal with the wire attached and disposed in the manner described, is positioned between the electrodes with the latter contacting the flag and the portion of the terminal to which it is attached. When the terminal is thus positioned, the current is turned on, and this current flows between the electrodes through the terminal. While this is occurring, the terminals are advanced toward each other under predetermined pressure to clamp the wire between the flag and the terminal. In a typical spot welding machine of the type used in this operation, the electrodes are conventionally moved toward each other either pneumatically or mechanically through a spring at a controlled pressure that can be adjusted within predetermined limits. The particular pressure used for the purpose of this invention will vary depending on the size of the terminal and the gage of the metal from which it is made. In actual practice, a large terminal made of relatively heavy gage metal used an electrode pressure of 16 psi, whereas a small terminal made of relatively light gage metal used an electrode pressure of only 2 psi. These are the electrode pressures at which the wire clamping flags on the two terminals referred to resisted the pressures of the electrodes until the neck portions of the terminals had become heated sufficiently to explode the insulation from the wire and to anneal to the point where they collapsed and clamped the wire adjacent to the neck. Also, spot welders of the above type are conventionally equipped with controls for regulating the amount of current flowing between the electrodes and the length of time the current is on. The entire operation is performed quickly. Typically, the current flows between the electrodes through the terminal only for about 4 cycles of the 60 cycle current or for about one-fifteenth of a second.

DESCRIPTION OF THE DRAWINGS

FIG. 1 is a side elevational view showing a typical coil with the ends of the wire attached to electrical terminals embodying the present invention;

FIG. 2 is a top plan view thereof showing the flag portions of the terminals in the initial unclamped position;

FIG. 3 is a view similar to FIG. 2 but showing the flag portions of the terminals in the wire clamping position;

FIG. 4 is a view similar to FIG. 3 but showing the terminal bent as it sometimes is following the welding operation;

FIG. 5 is an enlarged view showing the terminal attached to a lead cable and with its flag in its normal unclamped position and disassociated from the wire to which it is adapted to be connected;

FIG. 6 is an elevational view looking in the direction of the arrows 6—6 in FIG. 5;

FIG. 7 is an enlarged view of the terminal, per se, with its flag in the normal unclamped position;

FIG. 8 is a view looking in the direction of the arrows 8—8 in FIG. 7; and

FIG. 9 is an end elevational view looking in the direction of the arrows 9—9 in FIG. 7 and showing, in addition, the terminal in operative association with the electrodes of a spot welder or heat staker.

DESCRIPTION OF THE PREFERRED EMBODIMENT

The terminal here shown by way of illustration in FIGS. 1 through 9 comprises an elongate body 10 of a suitably formable, electrically and heat conductive material such as pretinned and tempered cold rolled steel. At one end of the body 10, as perhaps best shown in FIGS. 1 through 3 and 5 through 8, is an elongate post portion or member 12 having longitudinally spaced pairs of wire or cable clamping tabs 14 and 16 extending from the opposite edges thereof. The terminal conveniently may be formed by conventional metal stamping and forming operations and, initially prior to forming, both pairs of wire clamping tabs 14 and 16 extend laterally in the same plane as the body 10 and its post portion 12. However, during the forming operation, the tabs 14 and 16 are bent upwardly or at right angles to the plane of the terminal body to accept the wire or cable 18 to which the terminal is to be attached, as shown in FIGS. 5 and 6. Typically, the post end of the terminal is adapted to be attached to a relatively heavy wire 20 (such as 16 gage wire, for example) having an outer insulating sheath 22. Since the sheathing 22 is necessarily larger in diameter than the wire 20, the rear clamping tabs 16 are spaced further apart than the front clamping tabs 14, as shown in FIGS. 6 and 8, for example. In practice, the sheathing 22 is stripped back from the end of the wire 20 and, at the time of attachment of the terminal to the cable, the latter is laid on the post portion 12 with the end portion of the sheathing 22 between the rear tabs 16 and the projecting portion of the wire 20 from which the sheathing has been stripped between the front tabs 14. The front tabs 14 are then wrapped tightly around and crimped to the wire 18 and the rear tabs 16 are wrapped tightly around and crimped to the insulating sheathing 22 to fasten the terminal and the cable securely together, as shown in FIGS. 1 through 6.

In the typical environments previously described, the terminal is adapted to interconnect the relatively heavy-gage wire 20 mechanically and electrically to a relatively light wire (such as 30 gage, for example) typically used in the manufacture of a solenoid or other type of electrical coil. To this end, the body 10 is formed at the end thereof opposite the post member 12 with a connector portion 24 integrally with and extending longitudinally from the body at one side thereof, as perhaps best shown in FIG. 8. At the free end of the connector portion 24, laterally thereof, and attached to the inner edge 26 by an essentially thin integral neck portion 28 is a wire clamping tab or flag 30.

At the time of the initial stamping operation, the neck 28 and the flag 30 are disposed in the same plane as the connector portion 24; however, during forming of the stamped blank, the neck 28 is bent back toward the connector portion 24 to position the wire clamping flag 30 in acute angular relation with the connector portion, as perhaps best shown in FIG. 9. Bending of the neck 28 in the manner described positions the flag 30 so that the neck 28 can be bent further in the direction of the arrow 32 in FIG. 9 to press the flag against the adjacent side of the connector portion 24, as shown by broken lines in FIG. 9. However, until this final bending step is performed, the flag 30 is disposed in acute angular relation to the connector portion 24 as previously described and perhaps best shown in FIG. 9, and this is the position of the parts at the time the terminal is assembled on the bobbin 34 (shown in FIGS. 1 through 6) and at the time the light-gage coil wire is attached to the terminal.

In practice, the terminal will, in most instances, be assembled with and connected to the bobbin 34 on which the coil wire is wound, and in the particular construction here shown by way of illustration, the coil wire is connected to the terminal after the latter has been attached to the bobbin. It will be observed that the bobbin 34 is constructed so that the terminal can be assembled thereon with the tab or flag 30 in the partially bent but open position shown in FIG. 2. More particularly, the bobbin 34 is formed at one end thereof with a centrally disposed, tubular, longitudinal extension 36 of reduced diameter, and the latter has a pair of laterally spaced, radially extending, longitudinal ribs 38 and 40. Two aligned slots 42 and 44 extend through the ribs at substantially the midsections thereof, as shown in FIG. 2, and two transverse slots 46 and 48 extend from the outer faces of the ribs 38 and 40 and radially of the extension 36 so that they intersect the slots 42 and 44 at substantially their middle. It will be observed (FIG. 1) that the neck 28 is disposed at about the longitudinal center-line of the terminal so that, when the flag 30 is in the partly open position shown in FIG. 2, the terminal can be passed through the slots 42 and 44 from left to right, as viewed in FIG. 1. As the terminal is inserted into the slots 42 and 44, the neck 28 passes through the transverse slots 46 and 48 with the partly open flag 30 outside the ribs 38 and 40. It is desirable that the terminal fit the slots 42 and 44 relatively snugly so that it is held relatively firmly in the assembled condition.

In order to hold the terminal assembled with the bobbin, the terminal is formed at opposite sides thereof with rearwardly extending longitudinal fingers 50 and 52 having laterally bent tabs or stops 54 and 56 (shown in FIGS. 5 through 8) that seat against the rib 38 (FIG. 1) to limit the insertion movement of the terminal in the slots 42 and 44 to substantially the position shown in FIG. 1. Also, laterally of the connector portion 24 and to the right of the finger 52 as viewed in the drawings, particularly in FIGS. 5 through 8, the terminal is formed with a transverse, inwardly extending locking tab 58 that passes entirely through the slots 42 and 44 when the terminal is inserted and which just clears the rib 40 when the stops 54 and 56 seat against the rib 38 so that it can be bent laterally to form a front stop that prevents retraction of the terminal and thus securely holds the latter assembled with the bobbin 34.

The light-gage coil wire 60 of course is wound around the bobbin 34 in the conventional manner and the end portion of the wire coming off the coil at the extension 36 passes upwardly (as shown in FIG. 1) toward the terminal in any suitable or conventional manner. In the particular bobbin construction here shown by way of example, the coil wire 60 extends through a slot 62 in the adjacent bobbin flange 63 and thence under the rib 38 which is foreshortened, as shown in FIG. 1, and then upwardly between the ribs 38 and 40 and laterally through the transverse slot 48 from which its passes upwardly behind the connector portion 24 and then forwardly over the upper edge of the connector portion where it is positioned by a recess 64. If desired, the portion of the coil wire 60 passing through the slot 48 may also pass through the opening 66 that defines the front locking tab 58 to position and hold the wire properly with respect to the connector portion 24 and also to hold the portion of the wire extending between the coil and the slot 48 relatively taut. The portion of the coil wire 60 extending from the positioning notch 64 is passed downwardly as shown in FIG. 1 and wrapped once or twice around the terminal neck 28. It is desirable that some slack be left in the coil wire between the slot 48 and the neck 28 so that the connector portion of the terminal extending forwardly beyond the rib 40 can be bent to any position necessary or desirable, as shown for example in FIG. 4, to accommodate the bobbin and terminal assembly to the particular environment in which it is adapted to be used.

After the coil wire has been attached to the terminal in the manner hereinabove described, the flag 30 and the connector 24 are placed between the electrodes 68 and 70 of a spot welder or heat staker (not shown) and the electrodes are moved toward each other to explode the insulation from the wire and ultimately to bend the flag 30 from the full-line, partly open position shown in FIG. 9 to the closed, broken-line position 30' (FIG. 9) in the manner previously described. As previously suggested, the heat staking operation takes place very quickly. As soon as the electrodes 68 and 70 contact the terminal, current flows between the electrodes through the neck 28 and resistance to flow of the current through the relatively thin neck 28 causes the latter to heat up to or above the annealing temperature of the metal from which the terminal is made. In fact, the neck 28 may become red-hot. This blows or explodes the high temperature resin-type of insulation with which the coil wire is coated from the portion of the wire wrapped around the neck 28. It also anneals the metal in the neck 28 so that the flag 30 bends to the closed position 30', and clamps the wire between the flag and the coil 60. As the flag 30 reaches the fully closed position, it becomes heat staked to the underlying connector portion 24. Normally, this entire action takes place in about 4 cycles of the 60 cycle welding current or one-fifteenth of a second. Current is permitted to flow between the electrodes only for this period of time, and the duration of flow of the current is controlled by a timer with which welders or heat stakers of the type used in this operation conventionally are equipped.

The portion of the coil wire extending between the positioning notch 64 and the neck 28 passes behind the flag 30 and consequently is clamped between the flag and the connector portion 24 of the terminal. However, while the neck 28 is heated to a very high temperature because of its thin configuration and consequential resistance to flow of current between the electrodes, the flag 30 and the connector portion 24 which are in direct contact with the electrodes are not heated to a temperature above the annealing temperature of the wire because of their much greater size and mass. Consequently, the portion of the coil wire coming off the neck 28 and clamped between the flag 30 and the connector portion 24 is not heated to the same high temperature as the portion that is wrapped around the neck and it therefore retains its strength to such a degree that vibrations or other conditions that heretofore have tended to cause the wire to break at the terminal in use no longer have this effect. As a result, the coil has a much longer life.

FIG. 2 shows the terminal just described at the upper end of the bobbin 34, as viewed in FIGS. 2, 3 and 4, and it shows a similar but modified terminal 72 at the underside of the bobbin. The coil wire coming off the bottom end of the bobbin 34 is wrapped around and connected to the connector portion of the bottom terminal 72 in the same way it is connected to the upper terminal, but the mounting portion of the terminal 72 that attaches to the bobbin is modified. In both instances, however, the two terminals project similarly from the portion of the bobbin 34 to which they are attached and the wire wrapping and heat staking operations performed thereon are identical. After these operations are completed, the terminals are bent back out of the way, as shown in FIG. 4, to accommodate an environmental condition with which the particular coil here shown is adapted to be used.

While it will be apparent that the invention herein described is well calculated to achieve the benefits and advantages as hereinabove set forth, it will be appreciated that the invention is susceptible to modification, variation and change without departing from the spirit thereof.

Having thus described the invention, we claim:

1. An electrical connection comprising an electrical terminal and a current carrying wire coated with a resin-type of high temperature insulation and suitable for use particularly in situations that subject the wire to vibrations or other conditions likely to result in a high incidence of wire breakage at the terminal, said terminal being of a metallic material and having a pair of relatively large clamping portions having a relatively low resistance to flow of electrical current therethrough and being interconnected therebetween by a deformable, relatively narrow neck portion having a relatively high resistance to flow of electrical current therethrough and having a first portion of said coated wire wrapped therearound, said clamping portions having relatively large, flat wire engaging clamping faces extending between the respective relatively thin side edges thereof and having a second portion of said coated wire disposed therebetween, said clamping faces being disposed in close proximate face-to-face clamping relationship with said second portion of said coated wire as a result of at least one of said clamping portions being engaged by a current carrying element with sufficient force to cause bending of said neck portion, said second wire portion having been subjected to a clamping force applied in a direction generally perpendicular to the respective clamping faces so that said second wire portion is fixedly secured to said terminal by being physically clamped between said relatively large flat clamping faces and not between the relatively thin edges of the clamping portions, said first portion of said wire wrapped around said neck portion of said terminal having the insulation exploded therefrom as a result of electrical current from said element flowing through said high-resistant neck portion to assure a good electrical connection between said wire and said terminal, the relatively low resistance characteristic of said clamping portions preventing said clamping portions from being heated sufficiently to blow the insulation from the clamped portion of said wire and thus maintaining the resistance thereof to breakage due to vibrations and other adverse conditions occurring in use.

2. The invention as defined by claim 1 including means adjacent to one of said clamping portions for locating and positioning at least one portion of the wire extending from said neck.

3. The invention as defined by claim 2 wherein the means for locating and positioning the mentioned portion of said wire comprises a recess in a portion of said terminal extending from and formed integrally with one of said clamping portions.

4. The invention as defined in claim 3 including slot means provided in a portion of the terminal opposite and remote from said recess and disposed farther than the latter from said clamping portions for accepting and loosely retaining at least one of said wire portions extending from said neck portion and located and positioned by said recess.

5. The invention as defined by claim 4 wherein said slot means has an essentially keyhole-shape terminal portion disposed substantially transversely of said terminal and a wire-accepting slot portion communicating with and extending from said keyhole-shaped portion through an adjacent edge of said terminal.

6. The invention as defined by claim 1 wherein said clamping portions and said neck portion are disposed at one end of said terminal, and which further includes
a cable connecting portion at the end of said terminal remote from said clamping and neck portions.

7. The invention as defined by claim 6 including mounting and fastening means intermediate said clamping portions and said cable connecting portion for associating and detachably connecting said terminal to a spool or the like about which wire extending from said neck portion is adapted to be wound.

8. The invention as defined by claim 7 wherein said mounting and fastening means comprises flexible and resilient spring arms disposed at opposite sides of said terminal and extending longitudinally thereof.

9. The invention as defined by claim 8 wherein said flexible and resilient spring arms extend longitudinally in a direction away from said electrode-seating portions and said neck portion.

10. An electrical terminal adapted for operative association with a current carrying wire coated with a resin-type of high temperature insulation and suitable for use particularly in situations that subject the wire to vibrations or other conditions likely to result in a high incidence of wire breakage at said terminal,
said terminal being of a metallic material and having a pair of relatively large clamping portions having a relatively low resistance to flow of electrical current therethrough, said clamping portions being interconnected by a deformable, relatively narrow neck portion having a relatively high resistance to flow of electrical current therethrough and adapted to have a first portion of the associated coated wire wrapped therearound,
said clamping portions having relatively large, flat wire engaging clamping faces extending between the respective relatively thin side edges thereof, said clamping portions adapted to be disposed such that said clamping faces are in close proximate face-to-face clamping relationship with a second portion of the associated coated wire as a result of at least one of said clamping portions being engaged by a current carrying element with sufficient force to cause bending of said neck portion, whereby the second wire portion is subjected to a clamping force applied in a direction generally perpendicular to the respective clamping faces so that the second wire portion is fixedly secured to said terminal by being physically clamped between said relatively large flat clamping faces and not between the relatively thin edges of the clamping portions,
the first portion of the associated wire wrapped around said neck portion of said terminal adapted to have the insulation exploded therefrom as a result of electrical current from the element flowing through said high-resistant neck portion so as to provide a good electrical connection between the associated wire and said terminal, the relatively low resistance characteristics of said clamping portions preventing said clamping portions from being heated sufficiently by the current carrying element so as to in turn prevent the insulation from being blown off the second portion of the associated wire and thus maintaining the resistance to breakage of the wire due to vibrations and other adverse conditions occurring in use of said terminal.

11. The invention as defined by claim 10 including means adjacent to one of said clamping portions for locating and positioning at least one portion of a wire extending from said neck.

12. The invention as defined by claim 11 wherein the means for locating and positioning the mentioned portion of a wire comprises a recess in a portion of said terminal extending from and formed integrally with one of said clamping portions.

13. The invention as defined in claim 12 including slot means provided in a portion of the terminal opposite and remote from said recess and disposed farther than the latter from said clamping portions for accepting and loosely retaining at least one portion of a wire extending from said neck portion and located and positioned by said recess.

14. The invention defined by claim 13 wherein said slot means has an essentially keyhole-shape terminal portion disposed substantially transversely of said terminal and a wire-accepting slot portion communicating with and extending from said keyhole-shaped portion through an adjacent edge of said terminal.

15. The invention as defined by claim 10 wherein said clamping portions and said neck portion are disposed at one end of said terminal, and which further includes
a cable connecting portion at the end of said terminal remote from said clamping and neck portions.

16. The invention as defined by claim 15 including mounting and fastening means intermediate said clamping portions and said cable connecting portion for associating and detachably connecting said terminal to a spool or the like about which wire extending from said neck portion is adapted to be wound.

17. The invention as defined by claim 16 wherein said mounting and fastening means comprises flexible and resilient spring arms disposed at opposite sides of said terminal and extending longitudinally thereof.

18. The invention as defined by claim 17 wherein said flexible and resilient spring arms extend longitudinally in a direction away from said electrode-seating portions and said neck portion.

* * * * *